Dec. 9, 1969     T. FRENCH     3,482,616
PNEUMATIC TIRE TREAD
Filed July 11, 1967     4 Sheets-Sheet 1
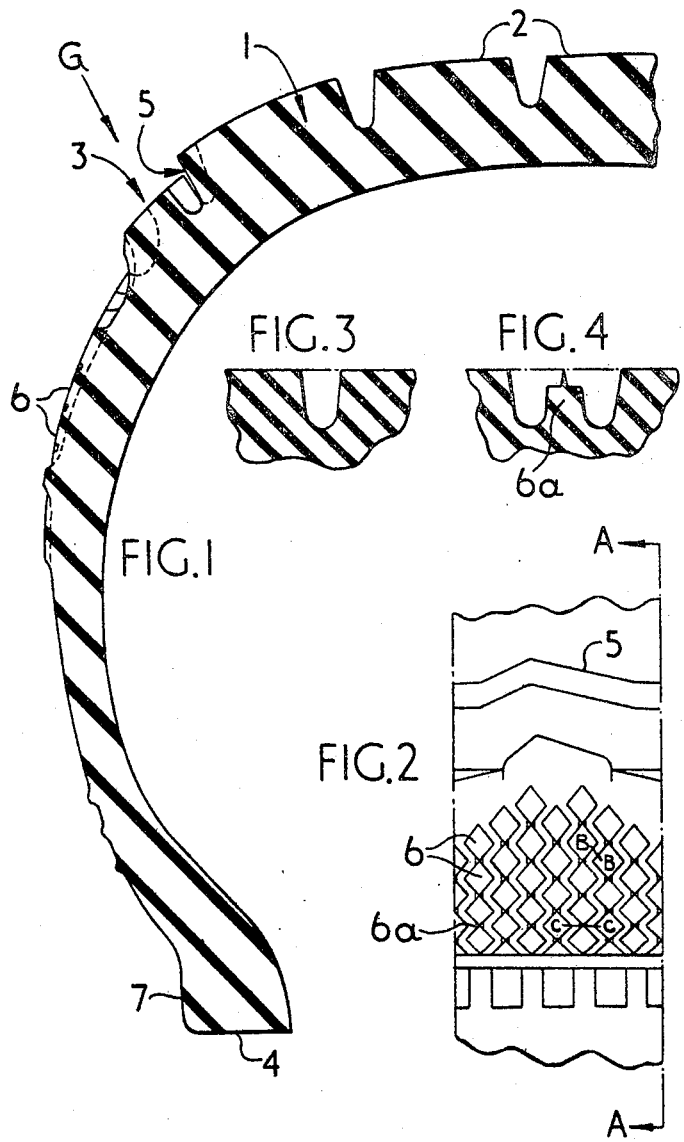
Tom French
INVENTOR
By Rauber & Lazar
HIS ATTORNEYS

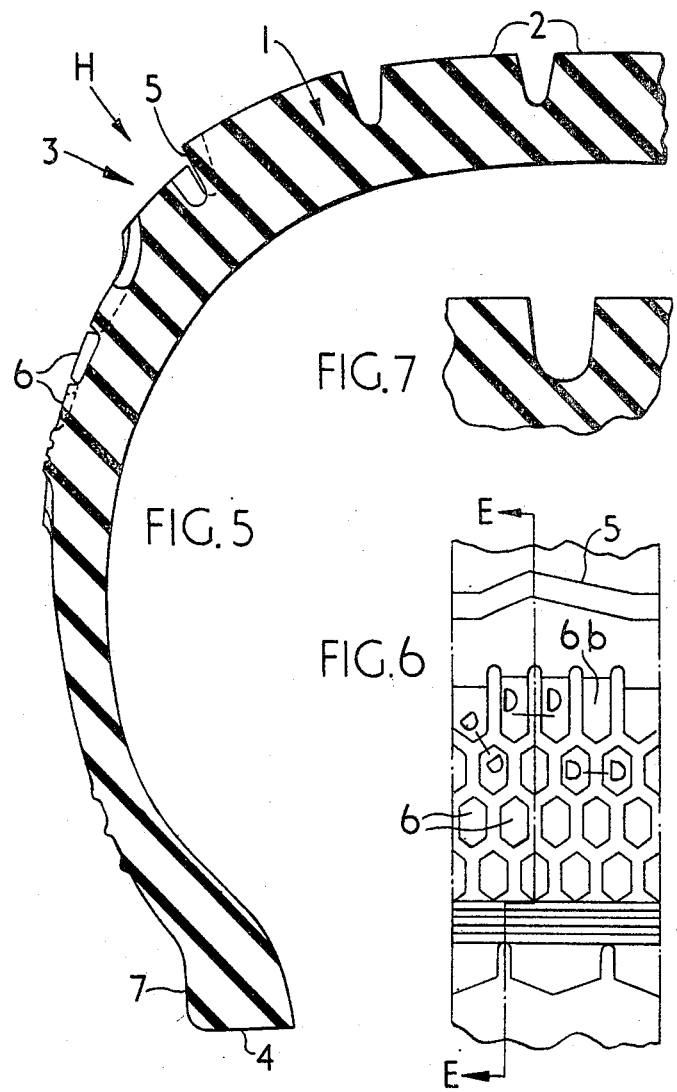

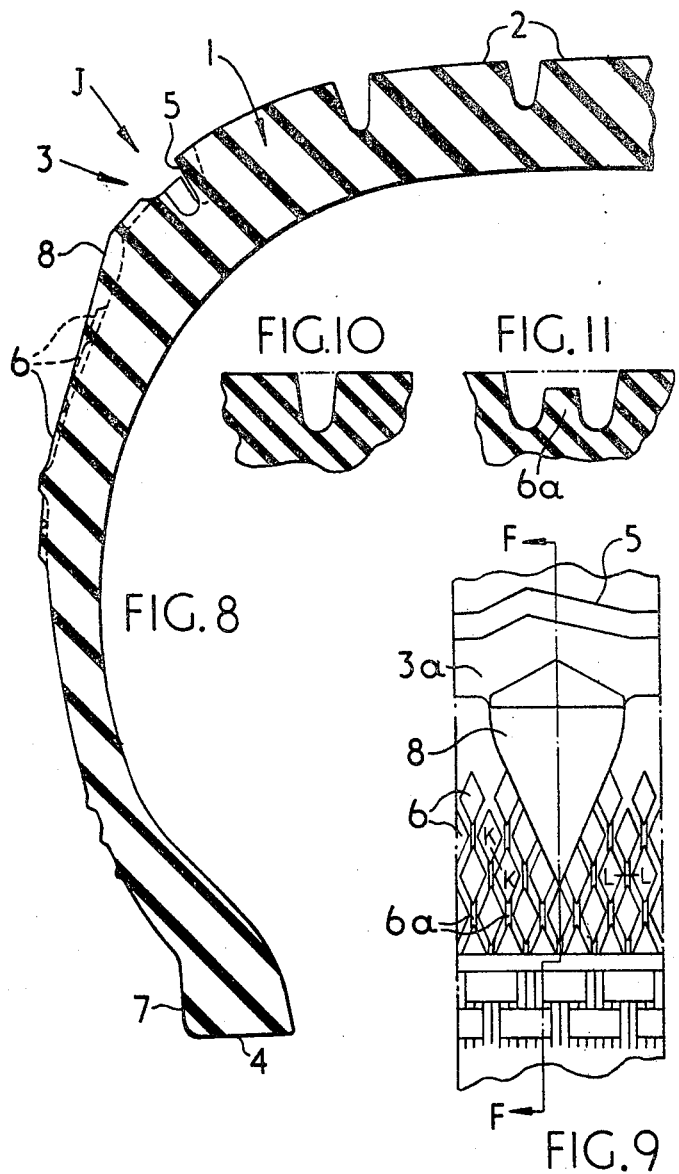

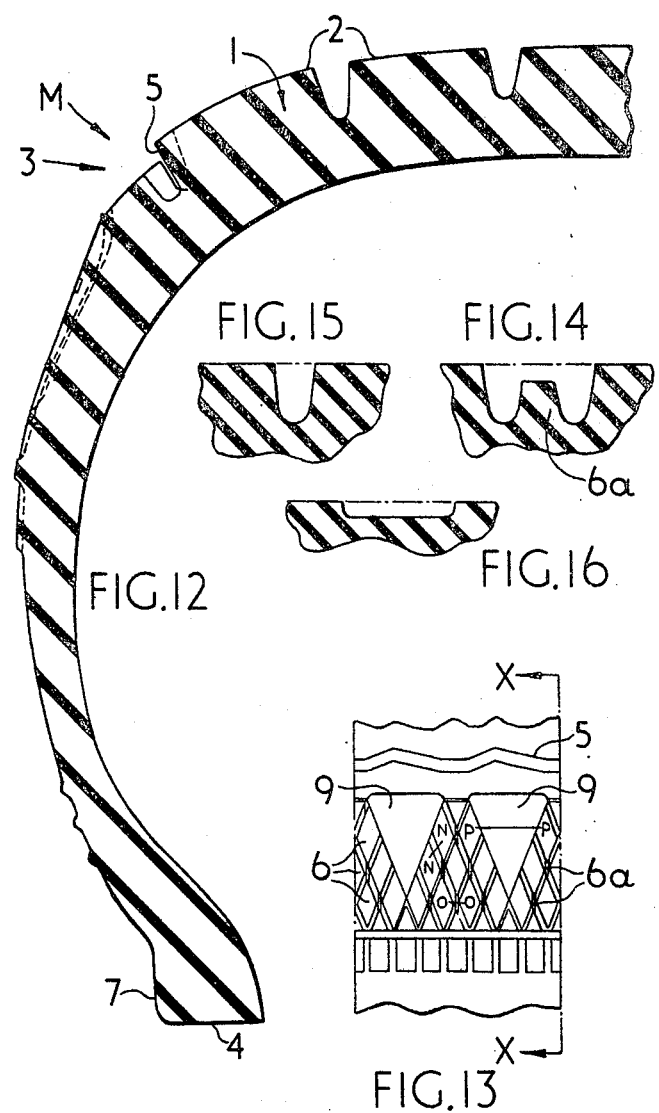

United States Patent Office 3,482,616
Patented Dec. 9, 1969

3,482,616
PNEUMATIC TIRE TREAD
Tom French, Sutton Coldfield, England, assignor to The Dunlop Company Limited, London, England, a British company
Filed July 11, 1967, Ser. No. 652,542
Claims priority, application Great Britain, July 13, 1966, 31,372/66
Int. Cl. B60c 11/08
U.S. Cl. 152—209       18 Claims

ABSTRACT OF THE DISCLOSURE

A pneumatic tire comprising bead regions, a tread region, and shoulder regions, a plurality of small flexible protuberances being provided in the shoulder regions of the tire and extending from the tread edges between ⅓ and ⅙ of the height of the tire measured from the bead base to the tread edge measured radially round the tire section curvature. The protuberances are to prevent the wheels of a road vehicle, for example, from being deflected when they meet a small raised step on the road surface e. g. a marker line, at a small acute angle.

---

This invention relates to pneumatic tires.

Difficulty has been experienced, when pneumatic tires mounted on the steerable wheels of a vehicle, are driven at a slightly inclined angle towards, for example, raised white marker lines applied to a road surface or the junction of areas of concrete forming a road surface, so that the tire will ride over them. When the shoulder of the tire engages with either the raised white lines or the junction between the concrete areas, there is a tendency for the tire shoulder, as it engages the raised portion to deflect the tire from its steered course so that the tire will not, without steering correction, roll over and past the raised portion.

It has been proposed to provide a stepped-shoulder portion in which a rib or the like, in an axially outermost position of the shoulder, is stepped down, in the radially inward sense from the remainder of the tread, this graduation of profile causing the tire to ride, first by means of the shoulder, over raised edges substantially without resistance.

The difficulty, however, with this arrangement is that, after a considerable length of tire useage, accumulated wear on the tread is greater than that on the shoulders and the shoulder step eventually disappears.

It is an object of the present invention to provide an improved tire construction of this kind.

According to the present invention there is aprovided a pneumatic tire having a tread portion provided with a series of ribs, blocks or the like and a shoulder portion having a ground-contacting surface which is divided into substantially smaller areas than those provided on the tread, in the form of protuberances, the resistance to deflection of the protuberances under a given load per unit area being substantially less than that offered by a corresponding adjacent unit area of the tread portion under the same load whereby when a load is applied to the shoulder portion as the tire rolls along the road surface to ride over an edge formed on the road surface disposed at a slight inclination to the direction of rotation of the tire, the shoulder protuberances firstly are compressed or deflected by the load applied by the edge gradually to transfer the edge load to the main load-carrying tread area of the tire as the tire is steered over the edge.

The protuberances can take the form of clusters of flexible, yielding, rubber rods or bristles and the rods or bristles can be quadrilateral, polygonal, elliptical, oval or crescent but preferably they are of circular cross-section. They may be unifomly spaced-apart, the cross-section of each of the protuberances may be between .05 and .002 square inch, the depth of each of the protuberances, in an unworn tyre, may be 0.2 inch, and it may be arranged that the protuberances decrease in depth from a position adjacent to the tread edge where they may be, for example, 0.1 inch to a position at the radially innermost limit of the area covered by the protuberances at which point they may be reduced in depth to 0.05 inch.

The area covered by the protuberances may be annular and extend in height to between ⅓ and ⅙ of the height of the tire measured from the bead base to the edge of the tread, measured radially around the tire section curvature, and it may be desirable that they should cover about ¼ of this height. As regards density of protuberances, the area occupied by the free ends of the protuberances may be between 30 and 85 percent of the total area within which they are located and it may be desirable that they should constitute 55 percent of this area.

Preferably where the cross-section of the protuberances is greater in one dimension than in another, for example, when the protuberances are of rectangular or oval cross-section, the greater dimension, for the purpose of stability should not be excessively greater than the smaller dimension and it may be that the limit to this ratio should not exceed 10:1.

Embodiments of the invention will now be described, by way of example, with reference to the accompanying drawings wherein:

FIGURE 1 is an axial cross-sectional view along line A—A of FIGURE 2 through part of a tire according to one embodiment of the invention.

FIGURE 2 is a diagrammatic view seen along the arrow G in FIGURE 1 of part of the shoulder region of a tire according to one embodiment of the invention.

FIGURE 3 is a sectional view along line B—B through part of the shoulder region of the tire shown in FIGURE 2.

FIGURE 4 is a sectional view along line C—C through part of the shoulder region of the tire shown in FIGURE 2.

FIGURE 5 is an axial cross-sectional view along line E—E of FIGURE 6 through part of a tire according to a second embodiment of the invention.

FIGURE 6 is a diagrammatic view seen along the arrow H in FIGURE 5 of part of the shoulder region of a' tire according to a second embodiment of the invention.

FIGURE 7 is a sectional view along lines D—D in FIGURE 6.

FIGURE 8 is an axial cross-sectional view along line F—F of FIGURE 9 through part of a tire according to a third embodiment of the invention.

FIGURE 9 is a diagrammatic view seen along the arrow J in FIGURE 8 of part of the shoulder region of a tire according to a third embodiment of the invention.

FIGURE 10 is a sectional view along lines K—K of FIGURE 9.

FIGURE 11 is a sectional view along lines L—L of FIGURE 9.

FIGURE 12 is an axial cross-sectional view along line X—X of FIGURE 13 through part of a tire according to a fourth embodiment of the invention.

FIGURE 13 is a diagrammatic view seen along the arrow M in FIGURE 12 of part of the shoulder region of a tire according to a fourth embodiment of the invention.

FIGURE 14 is a sectional view along lines O—O of FIGURE 13.

FIGURE 15 is a sectional view along lines N—N of FIGURE 13.

FIGURE 16 is a sectional view along lines P—P of FIGURE 13.

As shown in FIGURES 1 to 4, one embodiment of the invention comprises a pneumatic tire provided with a tread portion 1 having circumferential ribs 2 and two annular integral stepped shoulder portions 3 (only one of which is shown) as described at the opening of this specification. The shoulder area from the stepped shoulder portion extends a distance of approximately ¼ of the total depth of the tire measured from the bead base 4 to the tread edge 5 along the curvature of the section of the tire; this area is broken up into a plurality of fully interlocking protuberances 6 of substantially square cross-section, disposed in respect of the tire sidewall, so that a diagonal of the square form of the protuberances lies in a substantially radial direction in respect of the tire. The protuberances are slightly larger near to the stepped shoulder edge 3 of the area compared with sizes of the protuberances nearest the bead portion 7 of the tire, varying from a size of .125 to .1 inch measured along an edge of the square. Concentration of the protuberances, which are equally spaced-apart, is, an average of 42 protuberances to each square inch. The depth of the protuberances varies, the largest protuberance having a depth of .125 inch, the smallest having a depth of .075 inch.

The protuberances 6 are linked in radially aligned groups by bridging ribs 6a shown, in cross-section, in FIGURE 4.

A second embodiment illustrated in FIGURES 5, 6 and 7, wherein the reference numbers used refer to similar correspondingly numbered elements FIGURES 1 to 4, comprises a pneumatic tire having a tread portion 1 and stepped shoulder region 3 similar to the tire of the first embodiment. However, the protuberances 6 in the area adjacent to the stepped shoulder region 3 in this embodiment comprise a series of hexagons, one diagonal of each hexagon lying in a substantially radial direction in respect of the rotational axis of the tire. All the protuberances 6 are of substantially equal cross-sectional area but vary in depth from 0.1 inch near the stepped shoulder region 3 to 0.04 inch near the edge of the area covered by the protuberances. The protuberances are disposed in separate circumferential rows, the protuberances in one row being offset from those in an adjacent row or rows and the radially outermost protuberances merging integrally with the rib of the stepped shoulder to form elongated fingers 6b.

A third embodiment of the invention is shown in FIGURES 8 to 11 wherein the reference numbers used again refer to similar elements correspondingly numbered in the aforementioned drawings. In this tire the protuberances 6 are fully interlocking parallelogram- or diamond-shaped, with the longer diameter lying in a substantially radial direction with respect to the rotational axis of the tire. The corners of the parallelogram having acute angles are joined to the corners of adjacent parallelograms by a series of bridging ribs 6a extending in a radial direction in respect of the rotational axis of the tire (see FIGURE 11). All the protuberances are of substantially equal cross-sectional area but vary in depth from .06 inch near the stepped shoulder region 3 to 0.03 inch near the edge of the region covered by the protuberances. In this embodiment the protuberances are interspersed with approximately triangular-shaped shoulder buttresses 8 (see FIGURE 9 especially) forming integral extensions to the circumferential shoulder rib 3a and which cover an area greater than that covered by a plurality of the protuberances.

A fourth embodiment of the invention is shown in FIGURES 12 to 16 wherein the reference numbers refer again to similar elements correspondingly numbered in the aforementioned drawings. In this tire the protuberances 6 are parallelogram-shaped similarly disposed to those on the tire of the third embodiment, and are interspersed with shoulder recesses 9 (see FIGURE 16). However, in this embodiment the parallelograms all have equal areas and equal depths (0.02 inch).

The arrangements of protuberances described have been described in conjunction with a stepped shoulder. In alternative arrangements the shoulder arrangement of protuberances is either in conjunction with a rounded or an angled shoulder construction which are both well-known in the art.

It is an advantage of each of the constructions just described that the shoulder or upper sidewall region of each of the tires is very flexible and wears slowly and evenly during substantially the whole life of the tire so that a graduated movement of the tire when steered angularly over longitudinal edges formed on a road surface under the conditions referred to earlier will take place throughout the life of the tire.

Having now described my invention what I claim is:

1. A pneumatic tire having a tread portion provided with a series of ribs, blocks or the like and a shoulder portion having a ground contacting surface which is divided into substantially smaller areas than those provided on the tread in the form of protuberances, the cross-sectional area of the ground contacting surface of each protuberance lying within the range 0.05 to 0.002 square inch, the resistance to deflection of the protuberances under a given load per unit area being substantially less than that offered by a corresponding adjacent area of the tread portion under the same load whereby when a load is applied to the shoulder portion as the tire rolls along the road surface to ride over an edge formed on the road surface disposed at a slight inclination to the direction of rotation of the tire, the shoulder protuberances firstly are compressed or deflected by the load applied by the edge gradually to transfer the edge load to the main-load-carrying tread area of the tire as the tire is steered over the edge.

2. A pneumatic tire according to claim 1 wherein the protuberances are uniformly spaced-apart.

3. A pneumatic tire according to claim 1 wherein the protuberances are arranged in clusters.

4. A pneumatic tire according to claim 1 wherein the protuberances are arranged in the shoulder regions of the tire and extend from the tread edges between ⅓ and ⅙ of the height of the tire measured from the bead base to the edge of the tread, measured radially around the tire section curvature.

5. A pneumatic tire according to claim 1 wherein the free ends of the protuberances occupy between 30 and 85 percent of the total area in which they are located.

6. A pneumatic tire according to claim 1 wherein the free ends of the protuberances occupy approximately 55 percent of the total area in which they are located.

7. A pneumatic tire according to claim 1 wherein the protuberances are quadrilateral in cross-section, the ratio of one diagonal to the other of each quadrilaeral not exceeding 10 to 1.

8. A pneumatic tire according to claim 1 wherein the protuberances have polygonal cross-sections.

9. A pneumatic tire according to claim 1 wherein the protuberances are circular in cross-section.

10. A pneumatic tire according to claim 1 wherein the protuberances are elliptical in cross-section, the ratio of the major to minor axis of each ellipse not exceeding 10 to 1.

11. A pneumatic tire according to claim 1 wherein the depth of each protuberance is 0.2 inch.

12. A pneumatic tire according to claim 1 wherein the height of the protuberances varies from one part of the area in which they are located to another.

13. A pneumatic tire according to claim 12 wherein the depth of the protuberances nearer the shoulder is greater than that of the protuberances nearest the bead.

14. A pneumatic tire according to claim 1 wherein the shoulder regions are provided with a plurality of circumferentially spaced shoulder buttresses interspersed between the protuberances.

15. A pneumatic tire according to claim 14 wherein some at least of the buttresses are provided with substantially circumferentially extending ribs.

16. A pneumatic tire according to claim 1 wherein the regions are provided with a plurality of circumferentially spaced-apart shoulder recesses.

17. A pneumatic tire according to claim 1 wherein the protuberances are linked together by means of bridging ribs.

18. A pneumatic tire according to claim 1 wherein some at least of the protuberances merge integrally into a shoulder rib.

References Cited

UNITED STATES PATENTS

| D. 92,401 | 6/1934 | Hower. | |
|---|---|---|---|
| 1,956,011 | 4/1934 | Evans | 152—209 |
| 2,621,698 | 12/1952 | Zohrer | 152—209 |
| 2,800,098 | 7/1957 | Crosby | 152—353 X |

DRAYTON E. HOFFMAN, Primary Examiner

C. B. LYON, Assistant Examiner

U.S. Cl. X.R.

152—352